United States Patent
Chang et al.

(10) Patent No.: US 6,246,492 B1
(45) Date of Patent: Jun. 12, 2001

(54) IMAGE READING HEAD HAVING DRIVING MOTOR MOUNTED TO CONTACT IMAGE SENSOR READER

(75) Inventors: Tony Chang; Michael Chen, both of Hsin-Chu (TW)

(73) Assignee: Avision, Inc., Hsin-Chu (TW)

( * ) Notice: Subject to any disclaimer, the term of this patent is extended or adjusted under 35 U.S.C. 154(b) by 0 days.

(21) Appl. No.: 09/020,429

(22) Filed: Feb. 9, 1998

Related U.S. Application Data

(63) Continuation-in-part of application No. 08/821,217, filed on Mar. 20, 1999.

(51) Int. Cl.[7] ........................................ H04N 1/04
(52) U.S. Cl. ....................... 358/497; 358/474; 358/412
(58) Field of Search ........................ 358/497, 494, 358/474, 471.472, 401, 482, 483, 505, 506, 509, 475, 500, 498, 296, 419, 420, 408, 412; 382/312; 399/211; 375/75; 271/162–164; 318/696, 808, 810; H04N 1/04, 1/36

(56) References Cited

U.S. PATENT DOCUMENTS

| | | | |
|---|---|---|---|
| 4,525,748 | * 6/1985 | Carbone | 358/474 |
| 4,965,638 | * 10/1990 | Hediger | 399/211 |
| 5,235,353 | * 8/1993 | Hirano et al. . | |
| 5,717,503 | * 2/1998 | Chien | 358/475 |
| 5,724,159 | * 3/1998 | Nakagawa et al. | 358/474 |
| 5,812,172 | * 9/1998 | Yamada | 347/171 |
| 5,857,133 | * 1/1999 | Sun | 399/211 |

\* cited by examiner

*Primary Examiner*—Cheukfan Lee
(74) *Attorney, Agent, or Firm*—H. C. Lin

(57) ABSTRACT

An optical reader and the driving motor of a scanner are integrally mounted on a movable module, which can slide back and forth along a track to scan an image. The driving motor exerts a force on a fixed rack attached to the frame of the scanner through a pinion. The reaction to the force causes the movable module to slide. The rack and pinion mechanism can be replaced with a friction tape and roller combination, or a steel wire wrapped around a wheel attached to the movable module.

9 Claims, 4 Drawing Sheets

IMAGE READING HEAD HAVING DRIVING MOTOR MOUNTED TO CONTACT IMAGE SENSOR READER

This is a Continuation-in-part Application of U.S. patent application Ser. No. 08/821,217, filed Mar. 20, 1997.

This invention relates to image scanner, facsimile and image printer—in particular to a reading head for such equipment.

The Flat Bed Image Scanner is widely used today as a periphery equipment for a computer. It can rapidly scan a document, a magazine, a book, a graph and a picture and input into a computer for processing. A flat bed scanner is composed of an optical reader, a driving mechanism, a processing circuit, a scanning window and a frame. Today, the trend is to make the scanner light-weight, thin, narrow and miniaturized. so it is desirable that the optical reading mechanism and the driving mechanism can occupy less space.

FIG. 1 shows a conventional technique. The components include a contact image sensor (CIS) 120, a stepping motor 132, a gear train 134, 136 (only two gears shown for brevity), an idler 136, a belt 130 for moving the CIS 120 and a guide rail (not shown).

The working principle of the image scanner is as follows: Referring to FIG. 1, a document to be scanned is placed on a glass window 110. The contact image sensor 120 converts the image signal into digital signals, which are fed to an image processor (not shown) and then to a computer for further processing. When the CIS 120 reads a row of image signals, the driving mechanism moves the CIS 120 to another scanning successively until the complete image is scanned.

Structurally, the conventional technique has the driving mechanism, the stepping motor 132 and the gear train 134, 136, the idler 138 installed in fixed positions on the frame (not shown). The belt 130 is attached to the CIS 120 at a certain point, and moves the CIS in directions indicated by the arrowheads 140. Such a structure occupies a great deal of space, and uses a great deal of material.

SUMMARY

An object of this invention is to reduce the size of a flat bed image scanner. Another object of this invention is to save material for the construction of the flat bed image scanner.

These object are achieved in this invention by combining the driving mechanism and the reading sensor in the same scanning module. A fixture is mounted on the frame of the scanner. When the driving mechanism exerts a force on the fixture, the reaction causes the movable module to glide back and forth along a track and to scan the image to be read. The force from the movable module can be exerted on the fixture through a rack and pinion mechanism between a gear and a grooved belt or a gear and a grooved frame The force can also be exerted through a wire or a ribbon fixed at two ends and wrapped around a wheel on the movable module.

DETAILED DESCRIPTION OF THE PREFERRED EMBODIMENTS

Figure 1:
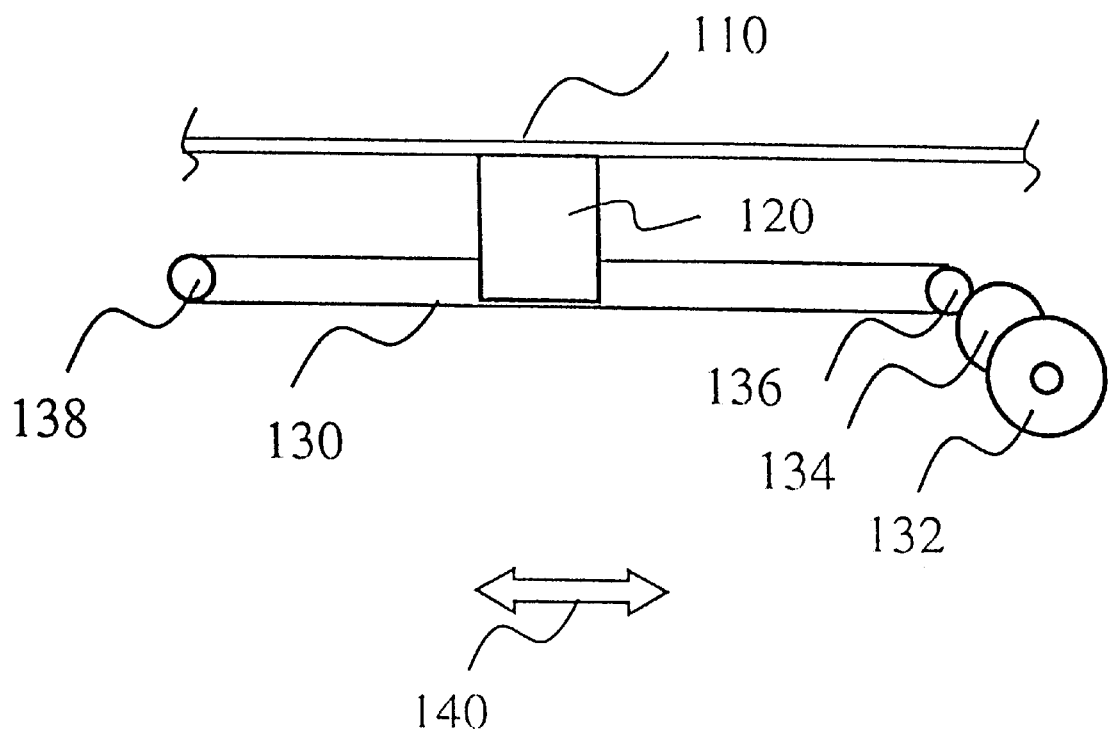
FIG. 1 shows a prior art structure of a flat image scanner.
Figure 2:
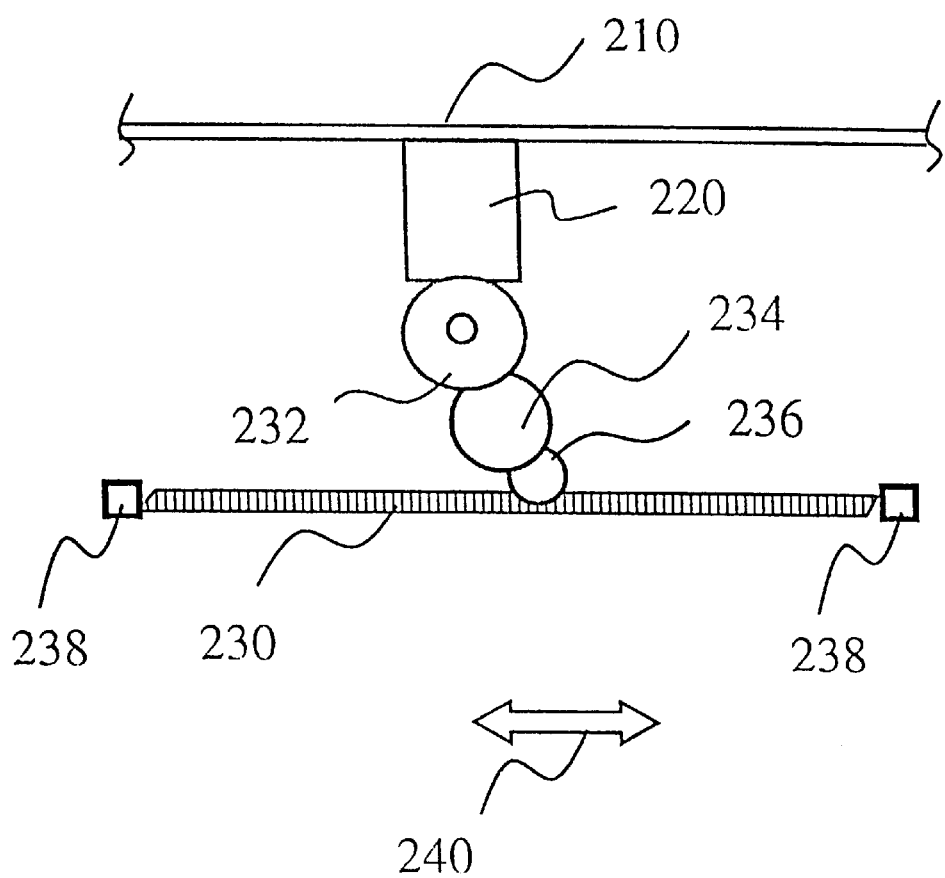
FIG. 2 shows a rack and pinion mechanism between a gear and a grooved belt for moving a combined driver and sensor scanning module.

In this invention the driving mechanism shown in FIG. 1 is totally altered to a new design. FIG. 2 shows the structure of the present invention. The contact image sensor 220 and the stepping motor 232 are integrated into an "integrated image reading and driving module", which moves as it scans. This integrated image reading and driving module depends on the gear train 234, 236 to control the speed. The gear 236 is driven by a belt 230. The ends of the belt 230 are fixed at points 238, and the belt itself does not move. When the gears train 234, 236 turns, the attached image read driving module moves back and forth along the direction of the arrowheads 240 in parallel with the belt and performs the function of scanning.

In comparison with conventional flat-bad image scanner, this invention has the following advantages:

In terms of space, the structure of this present invention saves the space occupied by the stepping motor 132, the gear train 134, 136 and the idler 138. The invention also saves the space and the material used up by the belt.

In terms of motion, belt 130 is a closed loop, while the belt 230 of this invention is fixed at two ends.

In terms of structure, the conventional belt has the contact image sensor attached at a fixed position. In this invention, the teeth of the idler 236 driven by the integrated reading and driving module engage the teeth of a fixed belt, so as to move the integrated reading and driving unit back and forth.

FIG. 2 shows the first embodiment of the present invention. The integrated reading and driving unit has the stepping motor 232, gear train 234, 236 mounted in fixed position relative to the contact image sensor 220 as a single unit. The gear train 234, 236 exerts force on the belt 230 which is fixed at the two ends 238.

Figure 3:
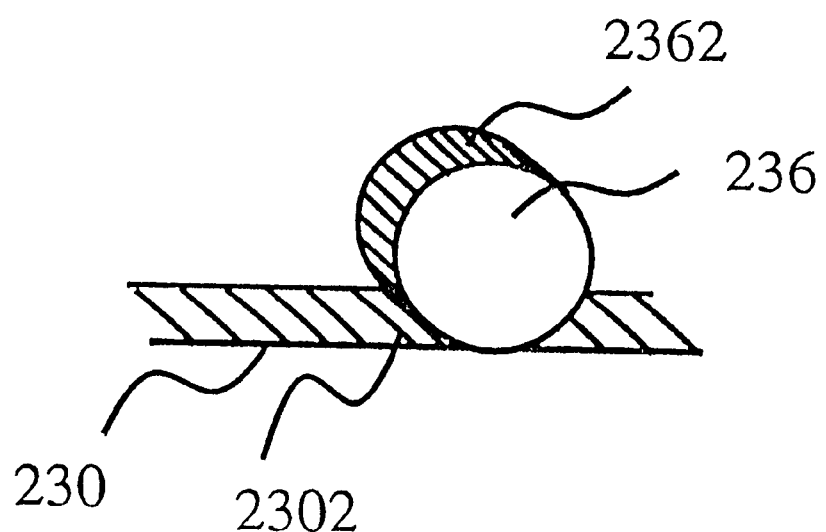
FIG. 3 shows an enlarged view of the contact between the gear and the grooved belt shown in FIG. 2.

FIG. 3 shows an enlarged view of how the gear 236 engages the belt 230. The grooves 2362 on the gear 236 engage the grooves 2302 on the belt 230. Then the gears 236 turns, the reaction force supplied by the grooves 2302 on the belt 230 drives the integrated reading and driving module back and forth.

The invention attaches the stepping motor 232 and the gear train 234, 236 on the contact image sensor. Thus, the space near the contact image sensor is fully utilized to reduce the overall volume of the scanner to be smaller than a conventional flat bed scanner. At least, the space occupied by the stepping motor 132, the gear train 134, 136, the idler 138 and the belt can now occupy half as much space. In addition, due to the reduction in component counts, the reliability can be improved and the cost of the product can greatly be reduced.

The feature of this invention is that the element receiving the driving force is stationary. In the previous embodiment of the present invention, the element receiving the force is a belt. In a second embodiment of this invention, the belt is eliminated. The element for receiving the driving force is directly built on the frame of the scanner. Thus the space and cost of the belt used in the first embodiment is further reduced.

In comparison with the conventional scanner shown in FIG. 1, this embodiment has at least the following advantages:

In terms of components, the idler 138 and belt 130 are eliminated.

In terms of space, this embodiment saves the space occupied by the stepping motor 132, the gear train 134, 136, the idler 138, and the belt 130.

In terms of motion, the belt 130 in the prior art is a moving, closed loop. This embodiment utilizes the unitary structure of the frame to receive the driving force. The technique and design principle are totally different from conventional design by using a motionless belt.

In terms of structure, the belt 130 in a conventional structure uses a belt which is a moving closed loop. This invention uses the frame of the scanner to receive the driving force. The technique and design are totally different from conventional ones.

Figure 4:
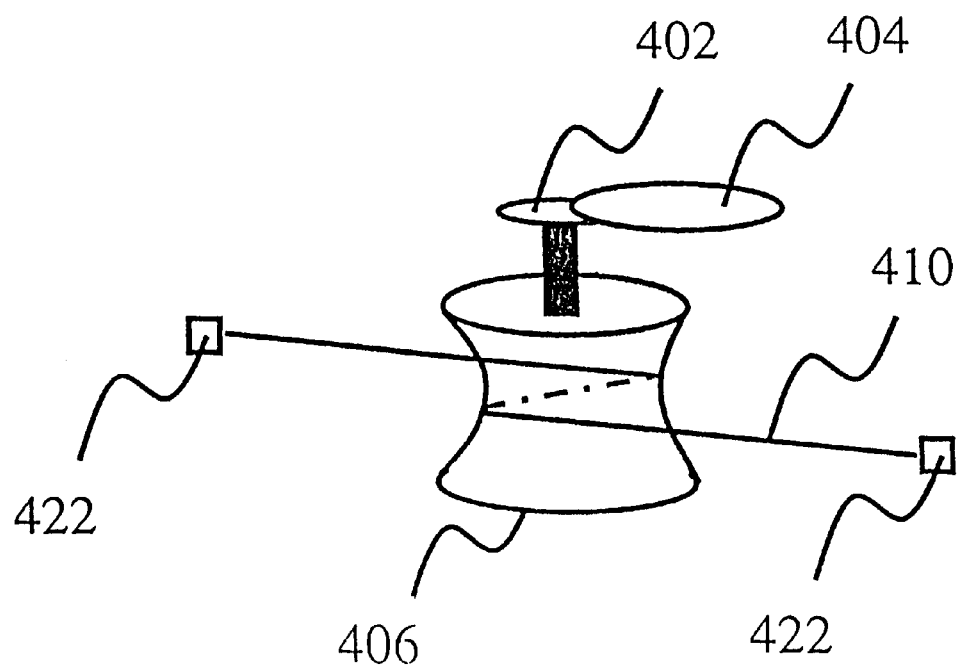
FIG. 4 shows another embodiment of the present where the transport mechanism is accomplished by means of a wire fixed at two ends and wrapped around the combined driver and sensor scanning module.

FIG. 4 shows a third embodiment of the present invention. The element receiving the driving force is a thin wire 410 or a ribbon with low index of elasticity. The thin wire or ribbon is fixed at two ends 422, which is fixed on the frame of the scanner or another frame mounted on the main frame, and is wrapped at least one turn around a driving roller or friction wheel 406. When the driving force is exerted, the roller or friction wheel 406 utilizes the reaction force to move the integrated reading and driving module back and forth along a guide. To implement the scanning function. The gear train 402, 404 transmits the driving force from the motor to the roller or friction wheel 406.

In comparison with conventional technique shown in FIG. 1, this embodiment has at least the following advantages:

In terms of component count, this embodiment does not use the idler 138, and the belt is substituted by a tight line 410.

In terms of space, this embodiment saves the space occupied by the idler 138 and the major space occupied by the belt 130.

In terms of motion, the conventional technique uses a moving, closed loop belt. This invention uses a tight wire to receive the driving force and is totally different from the conventional technique of using a moving belt.

In terms of structure, the conventional technique uses a moving, closed loop belt. This embodiment used a non-elastic wire or ribbon, which is fixed on to the frame of the scanner or another fixed frame, to receive the driving force. The technique and design principle is totally different from conventional ones.

The foregoing embodiments are preferred examples of the present invention and are not limited to these examples. For instance, the engagement of the gear and the grooves of the belt can be replaced with roller and friction tape or gear and corrugated tape. All these equivalent modifications are all within the scope of this invention.

What is claimed is:

1. A contact image sensor reading head for scanning a fixed image placed stationary on the scan window of a flat bed scanner having a frame and a track in a direction parallel to a direction of said scanning, comprising a movable module, having a contact image sensor reader and a driving motor and movable back and forth along said track, and a fixed means connected between two points on said frame for receiving a force exerted by said movable module and causing said movable module to react and to slide along said track during said scanning.

2. A contact image sensor reading head as described in claim 1, wherein said forced exerted by said movable module is transmitted to said fixed means by means of a rack and pinion mechanism, in which a pinion is attached to said movable module and said rack forms said fixed means.

3. A contact image sensor reading head as described in claim 2, wherein said rack is a flexible grooved belt and the pinion is attached to the movable module.

4. A contact image sensor reading head as described in claim 2, wherein said pinion is driven by a driving motor.

5. A contact image sensor reading head as described in claim 2, wherein said rack is mounted on said frame.

6. A contact image sensor reading head as described in claim 2, wherein said rack is grooved in said frame of the scanner.

7. A contact image sensor reading head as described in claim 1, where said force exerted by said movable module is transmitted by friction with a roller attached to said movable module and a friction tape forming said fixed means.

8. A contact image sensor reading head as described in claim 1, wherein said fixed means is a wire wrapped around a driving wheel attached to said movable module.

9. A contact image sensor reading head as described in claim 1, wherein said fixed means is a ribbon wrapped around a driving wheel attached to said movable module.

* * * * *